(12) United States Patent
Nitta et al.

(10) Patent No.: US 11,986,915 B2
(45) Date of Patent: May 21, 2024

(54) ROTARY TABLE DEVICE

(71) Applicant: TSUDAKOMA KOGYO KABUSHIKI KAISHA, Ishikawa-ken (JP)

(72) Inventors: Tetsuya Nitta, Ishikawa-ken (JP); Junichiro Ishizaki, Ishikawa-ken (JP)

(73) Assignee: TSUDAKOMA KOGYO KABUSHIKI KAISHA, Ishikawa-Ken (JP)

(*) Notice: Subject to any disclaimer, the term of this patent is extended or adjusted under 35 U.S.C. 154(b) by 122 days.

(21) Appl. No.: 17/701,175

(22) Filed: Mar. 22, 2022

(65) Prior Publication Data

US 2022/0371136 A1 Nov. 24, 2022

(30) Foreign Application Priority Data

May 19, 2021 (JP) .................. 2021-084544

(51) Int. Cl.
*B23Q 1/50* (2006.01)
*B23Q 16/02* (2006.01)
*F16C 19/54* (2006.01)

(52) U.S. Cl.
CPC ............ *B23Q 1/50* (2013.01); *B23Q 16/025* (2013.01); *F16C 19/54* (2013.01); *F16C 2322/39* (2013.01)

(58) Field of Classification Search
CPC ............................. B23Q 1/50; F16C 2322/39
See application file for complete search history.

(56) References Cited

U.S. PATENT DOCUMENTS

| | | | | |
|---|---|---|---|---|
| 3,667,305 A | * | 6/1972 | Rasoira ................. | B23Q 1/28 74/813 L |
| 7,418,889 B2 | * | 9/2008 | Nitta .................... | B23Q 16/102 74/813 L |
| 7,530,293 B2 | * | 5/2009 | Nitta .................... | F16C 19/545 74/813 R |
| 2005/0097976 A1 | | 5/2005 | Nitta | |

FOREIGN PATENT DOCUMENTS

| | | |
|---|---|---|
| EP | 1524066 A1 | 4/2005 |
| EP | 1529596 A2 | 5/2005 |
| JP | 2002-103181 A | 4/2002 |
| JP | 2005-138243 A | 6/2005 |
| KR | 10-2014-0080785 A | 7/2014 |

OTHER PUBLICATIONS

Sep. 9, 2022, European Search Report issued for related EP Application No. 22163848.9.

* cited by examiner

*Primary Examiner* — Thomas C Diaz
(74) *Attorney, Agent, or Firm* — Paratus Law Group, PLLC

(57) ABSTRACT

A rotary table device includes a table provided on one end-side of a main shaft rotatably supported in a frame; and a drive transmission mechanism transmit rotation of an output shaft of a drive motor to the main shaft and including a drive transmission member and accommodated in an accommodation space formed in the frame. The table is supported with respect to the frame by a bearing provided between a lower surface of the table and an upper surface of the frame, and a space is provided between the lower surface of the table and the upper surface of the frame. The frame is provided with a communication passage configured so that the space and the accommodation space communicate with each other.

2 Claims, 3 Drawing Sheets

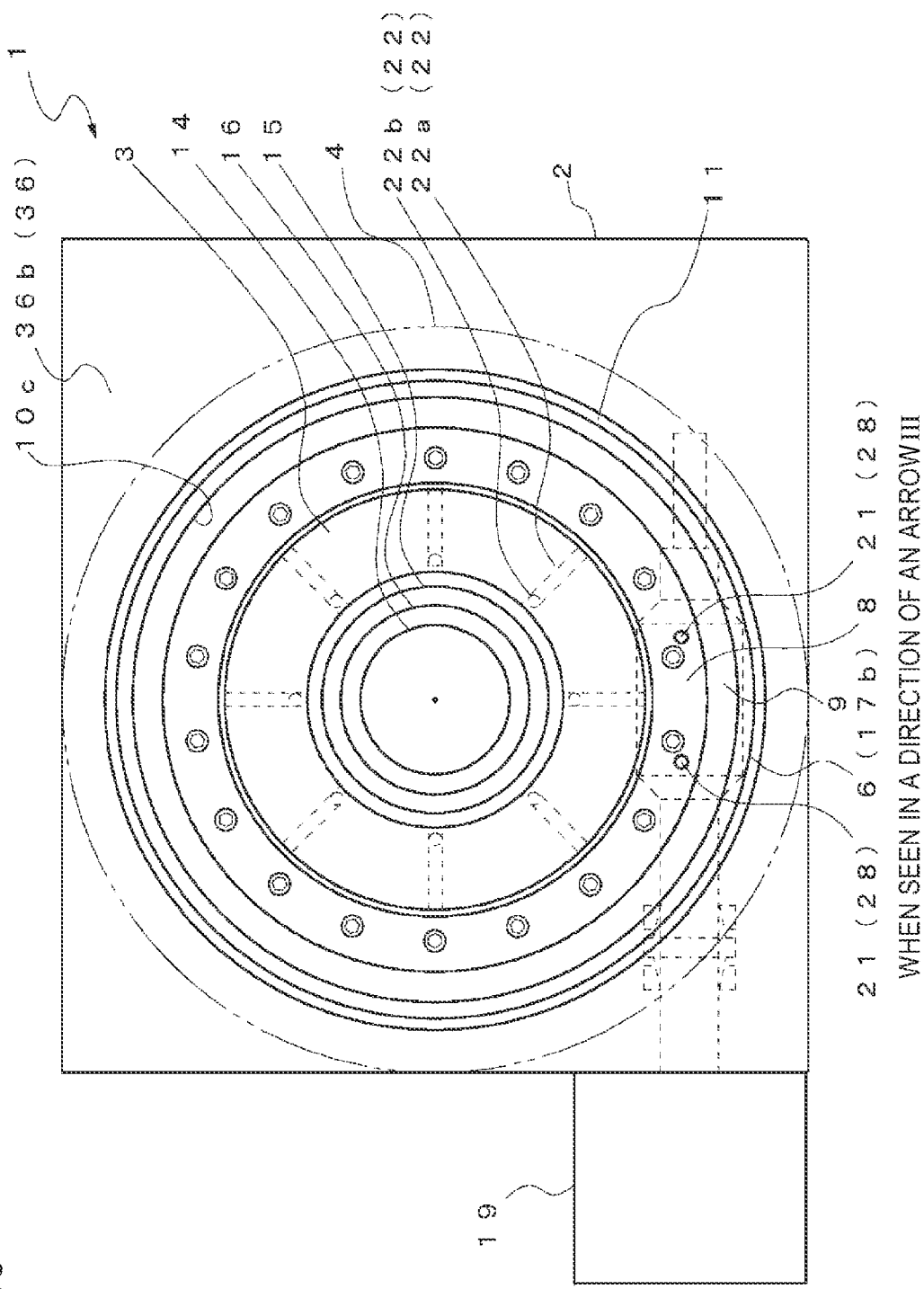

ROTARY TABLE DEVICE

CROSS-REFERENCE TO RELATED APPLICATION(S)

This application is based on and claims priority under 35 USC 119 from Japanese Patent Application No. 2021-084544 filed on May 19, 2021, the contents of which are incorporated herein by reference.

TECHNICAL FIELD

The present invention relates to a rotary table device including a table provided on one end-side of a main shaft rotatably supported in a frame; and a drive transmission mechanism configured to transmit rotation of an output shaft of a drive motor to the main shaft and including a drive transmission member having a spiral groove on an outer periphery and accommodated in an accommodation space formed in the frame, wherein the rotary table device is installed with an axis line of the main shaft being directed in a vertical direction, particularly, the table is supported with respect to the frame by a bearing provided between a lower surface of the table and an upper surface of the frame, and a space is provided between the lower surface of the table and the upper surface of the frame.

BACKGROUND ART

In the field of working machines, known is a rotary table device where a table on which a workpiece is fixed is provided on one end-side of a main shaft and the table is rotated by rotationally driving the main shaft. The rotary table device is installed on a working machine, for example, and is used to index an angular position of the table by rotationally driving the main shaft and to process the workpiece at the indexed angular position. Therefore, the rotary table device has a drive transmission mechanism for transmitting rotation of an output shaft of a drive motor to the main shaft.

As the drive transmission mechanism, for example, a worm mechanism including a worm and a worm wheel, a roller gear cam mechanism including a roller gear cam and a cam follower, or the like is adopted. Note that, the worm of the worm mechanism and the roller gear cam of the roller gear cam mechanism have a spiral groove provided on an outer periphery thereof, and correspond to the drive transmission member referred to in the present invention. In the rotary table device, the drive transmission member is accommodated in an accommodation space formed in a frame. Such rotary table device is disclosed in PTL 1, for example.

Note that, the rotary table device (hereinafter, referred to as 'conventional device') disclosed in PTL 1 is a so-called horizontal rotary table device that is installed with an axis line of a main shaft being directed in a vertical direction. In addition, the conventional device has a configuration where a bearing is provided between a lower surface of the table and an upper surface of the frame. With the configuration where the bearing is provided in this way, the conventional device is configured such that the table is supported with respect to the frame by the bearing in a form of resisting a weight of the workpiece and an external force resulting from processing of the workpiece, and therefore, the processing accuracy of the workpiece can be maintained even when the weight of the workpiece or the external force is large. For reference, in the conventional device configured as described above, there is a space between the lower surface of the table supported by the bearing and the upper surface of the frame supporting the bearing.

CITATION LIST

Patent Literature

PTL 1: JP2005-138243A

Meanwhile, in the configuration where the bearing is provided between the lower surface of the table and the upper surface of the frame as in the conventional device, the bearing is generally lubricated by grease. Specifically, in a general horizontal rotary table device including the conventional device, lubricating oil for lubricating the drive transmission mechanism (worm mechanism) is stored in a space inside the frame including the accommodation space. However, an amount of the lubricating oil is usually such that the drive transmission mechanism is immersed therein. In other words, the amount of the lubricating oil is such an amount that an oil level is present below the bearing provided as described above.

For this reason, since the bearing provided as described above is not lubricated by the lubricating oil, lubrication with grease (grease lubrication) is generally adopted. However, in a case of the grease lubrication, it is necessary to perform regular maintenance for the rotary table device so as to replenish the bearing with grease. The maintenance may involve disassembling the rotary table device, and in such a case, there is a problem that the maintenance puts a heavy burden on an operator.

SUMMARY

In view of the above problems of the conventional device, an object of the present invention is to provide a configuration whereby a burden, which is put on an operator so as to lubricate a bearing, can be reduced, in a horizontal rotary table device where a table is supported with respect to a frame by the bearing provided as described above.

A preamble of the present invention is a rotary table device including a table provided on one end-side of a main shaft rotatably supported in a frame; and a drive transmission mechanism configured to transmit rotation of an output shaft of a drive motor to the main shaft and including a drive transmission member having a spiral groove on an outer periphery and accommodated in an accommodation space formed in the frame, wherein the rotary table device is installed with an axis line of the main shaft being directed in a vertical direction, the table is supported with respect to the frame by a bearing provided between a lower surface of the table and an upper surface of the frame, and a space is provided between the lower surface of the table and the upper surface of the frame.

The present invention is characterized in that the frame is provided with a communication passage configured so that the space and the accommodation space communicate with each other.

In addition, in the rotary table device of the present invention, the communication passage is configured so that at least two communication passages communicate with the accommodation space at an interval in a longitudinal direction of the accommodation space.

According to the present invention, the configuration where the frame is provided with the communication passage configured so that the space and the accommodation space communicate with each other makes it possible to lubricate the bearing provided between the lower surface of the table and the upper surface of the frame by lubricating oil stored in the space inside the frame including the accommodation space. As a result, it is possible to reduce a burden that is put on an operator so as to lubricate the bearing.

More specifically, in the horizontal rotary table device that is the preamble of the present invention, the drive transmission member having the spiral groove is rotationally driven by the drive motor, so that a flow of lubricating oil is generated toward an end portion-side in the longitudinal direction in the accommodation space according to a rotation direction. Note that, since the accommodation space is a space whose both end portions are closed, the lubricating oil has no place to go and therefore stays on the end portion-side due to the flow toward the end portion-side as described above. Further, the flow of the lubricating oil as described above continues, so that a range in which the lubricating oil stays in the accommodation space gradually increases.

In addition, in the present invention, since the frame is provided with the communication passage configured to communicate with the accommodation space, when the range in which the lubricating oil stays in the accommodation space due to the above-mentioned flow of the lubricating oil increases and reaches a position of the communication passage, the lubricating oil affected by a pressure resulting from the flow is caused to flow into the communication passage-side. Since the communication passage also communicates with the space, the lubricating oil caused to flow into the communication passage flows into the space, so that the bearing is lubricated by the lubricating oil flowing into the space. That is, in the rotary table device, the bearing is lubricated by the lubricating oil that lubricates the drive transmission mechanism. Thereby, according to the rotary table device, since it is not necessary to adopt grease lubrication, the maintenance for grease lubrication as in the conventional device becomes unnecessary, so that the burden put on the operator can be reduced.

Further, in the rotary table device of the present invention, the communication passage is configured so that at least two communication passages communicate with the accommodation space at an interval in the longitudinal direction of the accommodation space. Thereby, the bearing is lubricated more effectively by the lubricating oil.

Specifically, in the horizontal rotary table device that is the preamble of the present invention, the drive transmission member is not rotationally driven only in one direction (forward rotation direction), but is also rotationally driven in an opposite direction (reverse rotation direction) by an indexed angular position of the table. The flow of the lubricating oil in the accommodation space becomes a flow in a direction corresponding to the rotation direction of the drive transmission member, as described above. In addition, the above-described range in which the lubricating oil stays increases from an end portion on a downstream side in the direction of the flow Further, in a case where a communication passage is configured so that only one communication passage communicates with the accommodation space, the communication passage is formed at a position where a distance from one or the other of both end portions of the accommodation space in the longitudinal direction is a half or more of an interval between both the end portions (a dimension of the accommodation space in the longitudinal direction). On the other hand, in a case where the communication passage is configured so that at least two communication passages communicate with the accommodation space, the communication passage can be configured to communicate with the accommodation space at each position closer to each end portion (a position of a distance smaller than the half of the above-described interval). According to such a configuration, as compared to the above-described configuration where the communication passage is configured so that only one communication passage communicates with the accommodation space, a time for which the range in which the lubricating oil stays increases from the end portion on the downstream side and reaches the position of the communication passage is shortened, regardless of the rotation direction of the drive transmission member that is rotationally driven. Therefore, according to the rotary table device, the lubrication of the bearing by the lubricating oil is performed more efficiently.

BRIEF DESCRIPTION OF DRAWINGS

FIG. 3 is a view; as seen in a direction of an arrow III in FIG. 1.

DESCRIPTION OF EMBODIMENTS

Hereinafter, one embodiment of a rotary table device to which the present invention is applied will be described with reference to the drawings.

Figure 1:
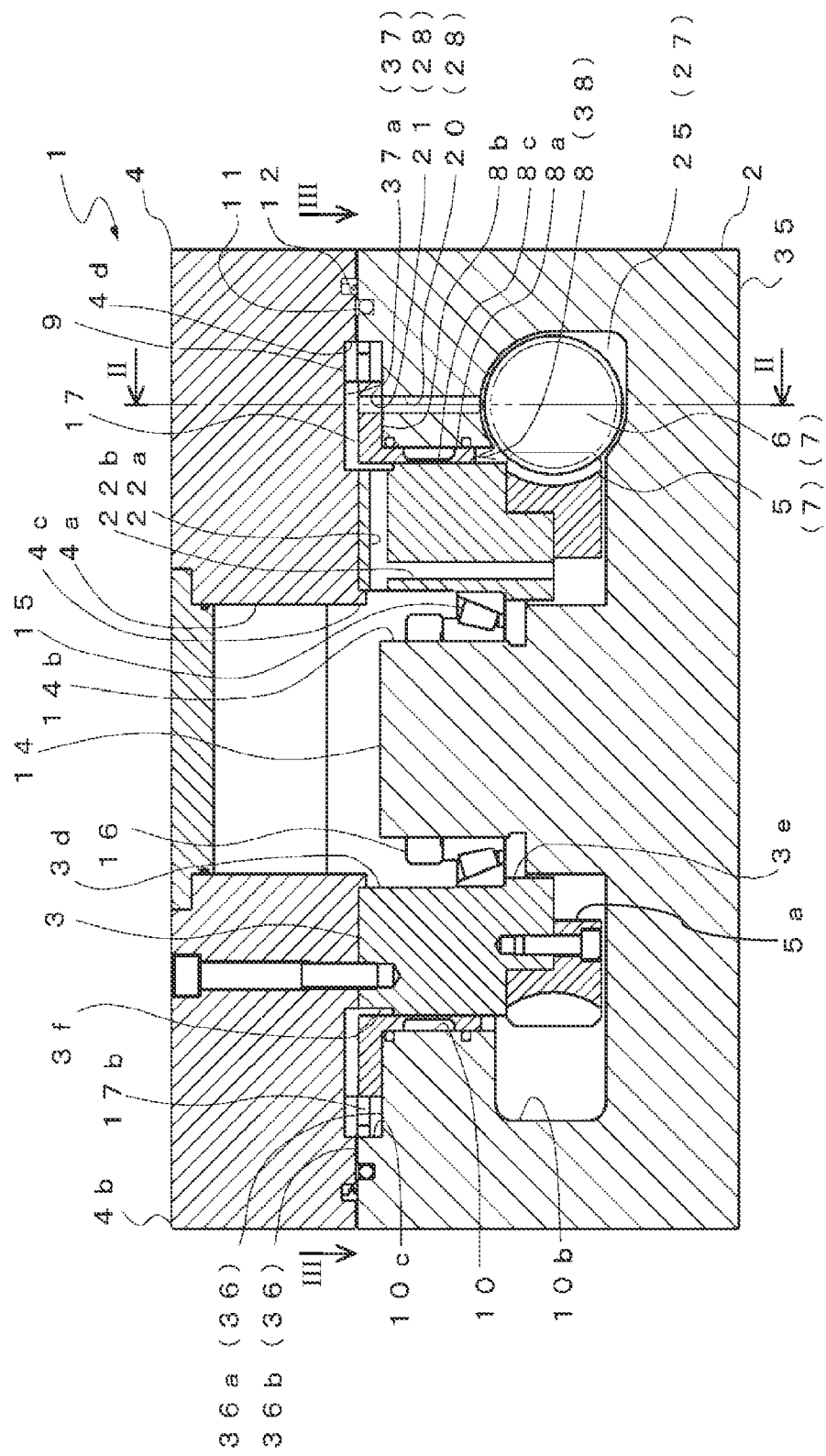
FIG. 1 is a front sectional view showing a rotary table device to which the present invention is applied.
Figure 2:
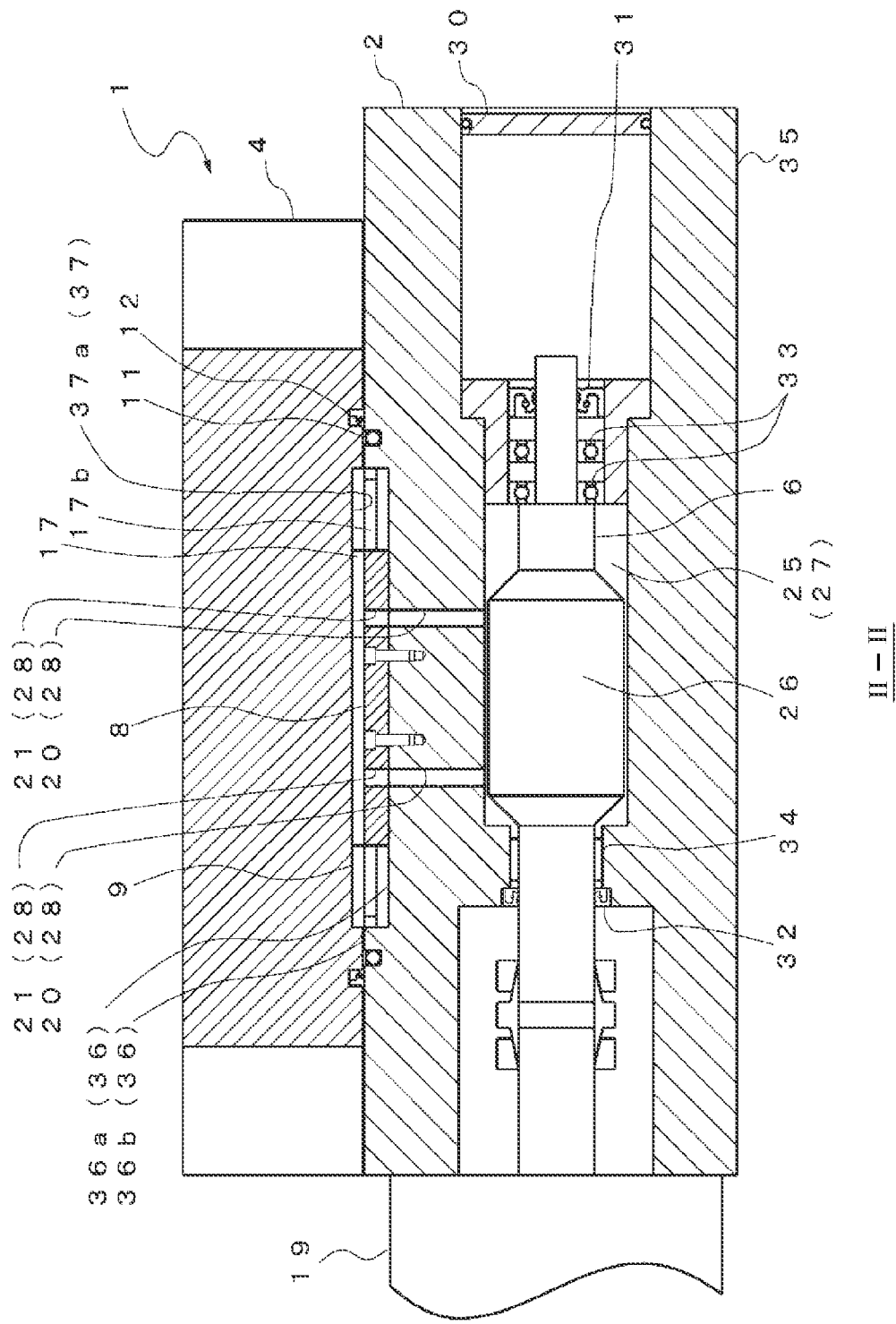
FIG. 2 is a sectional view taken along an II-II line in FIG. 1.

FIGS. 1 to 3 show a rotary table device 1 for a working machine to which the present invention is applied. As shown, the rotary table device 1 is a so-called horizontal rotary table device installed with an axis line of a main shaft being directed in a vertical direction. The rotary table device 1 includes a frame 2 attached to a working machine, a main shaft 3 rotatably supported in the frame 2, and a table 4 provided on one end-side of the main shaft 3.

More specifically, the frame 2 has a configuration where an accommodation hole 10 for accommodating the main shaft 3 is formed. Note that, the accommodation hole 10 is a bottomed hole that is closed on an installation surface 35-side, which is a surface to be installed on the working machine, and is opened on a surface (upper surface) 36 opposite to the installation surface 35. In addition, the accommodation hole 10 is a hole formed in such a shape that a diameter of a portion on a bottom surface-side, which is a portion in which a drive transmission mechanism (which will be described later) is accommodated, is enlarged. That is, the accommodation hole 10 has a first diameter-enlarged portion 10b on the bottom surface-side in the vertical direction. Further, the frame 2 has a cylindrical shaft part 14 protruding upward from the bottom surface of the accommodation hole 10 toward the upper surface 36-side and formed concentrically with the accommodation hole 10.

The main shaft 3 is a cylindrical shaft having such an outer diameter dimension that an interval between an outer peripheral surface thereof and an inner peripheral surface of a part other than the first diameter-enlarged portion 10b of the accommodation hole 10 is a predetermined size, and a through-hole 3d penetrating in an axis line direction thereof. Note that, an inner diameter of the through-hole 3d is larger than an outer diameter of the shaft part 14 of the frame 2. The main shaft 3 is provided in the accommodation hole 10 of the frame 2 in such a form that the shaft part 14 of the frame 2 is located in the through-hole 3d. In addition, the main shaft 3 is rotatably supported with respect to the shaft part 14 of the frame 2 via a bearing 15.

As for the support, specifically, a portion on a tip end-side of the shaft part 14 is formed as a support portion 14b having a diameter smaller than the other portion. In addition, the inner diameter of the through-hole 3d of the main shaft 3 has such a size that a gap in which the bearing 15 can be arranged is formed between an inner peripheral surface of the through-hole 3d and an outer peripheral surface of the support portion 14b of the shaft part 14 of the frame 2 in a state where the main shaft 3 is arranged in the accommodation hole 10 as described above. Further, the bearing (first bearing) 15 is interposed between the support portion 14b and the main shaft 3 (inner peripheral surface of the through-hole 3d). For reference, in the present embodiment, a conical roller bearing is adopted as the first bearing 15.

Note that, a male screw (not shown) is formed on an outer peripheral surface of an end portion of the support portion 14b of the shaft part 14, and a nut 16 is screwed onto the male screw. In addition, the main shaft 3 is formed so that an end portion of the through-hole 3d, which is the bottom surface-side of the accommodation hole 10, has a small diameter, and a step portion 3e is provided in the through-hole 3d. Further, the first bearing 15 is in a state where a position in the axis line direction of the shaft part 14 is fixed, in a form of being sandwiched between the nut 16 screwed onto the support portion 14b and the step portion 3e of the main shaft 3.

The table 4 is a disk-shaped member whose outer diameter is larger than the inner diameter of the accommodation hole 10 in the frame 2, and has a through-hole (center hole 4a) penetrating in a thickness direction at a center position. Note that, one of two end surfaces of the table 4 is a placement surface 4b for attaching a workpiece or the like, which is a processing target. In addition, a hole diameter of the center hole 4a is slightly smaller than the inner diameter of the through-hole 3d of the main shaft 3. Further, the other end surface of the table 4 is formed with a cylindrical fitting portion 4c protruding in the thickness direction around the center hole 4a and having an outer diameter dimension corresponding to the inner diameter of the through-hole 3d of the main shaft 3. The table 4 is attached to the main shaft 3 so as not to be relatively rotatable by a plurality of attaching bolts, in a state where the fitting portion 4c is fitted and positioned in the through-hole 3d of the main shaft 3 on one end-side of the main shaft 3.

Further, the rotary table device 1 includes a worm mechanism 7 as a drive transmission mechanism configured to transmit rotation of an output shaft of a drive motor 19, which is a drive source, to the main shaft 3. The worm mechanism 7 includes a worm wheel 5 attached to the main shaft 3 and a worm shaft 6 having a worm 26 connected to the worm wheel 5. For reference, as is well known, the worm 26 is a gear having spiral continuous teeth formed on an outer periphery of a cylinder, and tooth surfaces of the continuous teeth form a spiral groove shape.

Note that, the worm wheel 5 is attached to an end portion (an end portion on the other end-side) of the main shaft 3, which is the bottom surface-side, so as not to be relatively rotatable by a plurality of attaching bolts. The worm wheel 5 is accommodated in the first diameter-enlarged portion 10b of the accommodation hole 10 in a state of being attached to the main shaft 3. In addition, the worm shaft 6 is provided in the frame 2 in such a form that an axis line thereof is directed in a horizontal direction and the worm 26 is in mesh with the worm wheel 5. For this reason, the frame 2 is provided with an accommodation hole 25 for a worm shaft configured to accommodate the worm shaft 6 and formed so as to communicate with the first diameter-enlarged portion 10b of the accommodation hole 10 in which the worm wheel 5 is accommodated.

Further, the worm shaft 6 is configured to have the worm 26 at an intermediate position in the axis line direction thereof. The worm shaft 6 is rotatably supported with respect to the frame 2 in the accommodation hole 25 for a worm shaft by bearings 33 and 34 provided on both sides of the worm 26 in the axis line direction.

Note that, the accommodation hole 25 for a worm shaft is formed so that both sides in a longitudinal direction thereof are opened to side surfaces of the frame 2 (see FIG. 2). In addition, one of the side surfaces is an attaching surface for attaching the drive motor 19. The drive motor 19 is attached to the attaching surface in such a form that an output shaft thereof is inserted into the accommodation hole 25 for a worm shaft. Further, the output shaft of the drive motor 19 and the worm shaft 6 are connected so as not to be relatively rotatable by a coupling. Further, a disk-shaped cover member 30 is provided in a part of the accommodation hole 25 for a worm shaft, which is opened to the other of the side surfaces, in a form of being inserted and fitted into an inner peripheral surface of the accommodation hole for a worm shaft.

Further, the accommodation hole 25 for a worm shaft is provided with oil seals (a first oil seal 31 and a second oil seal 32) for closing an internal space thereof in such a form that the oil seals are mounted between the inner peripheral surface of the accommodation hole for a worm shaft and the outer peripheral surface of the worm shaft 6. The first oil seal 31 of the oil seals is provided between the bearing 33, which is a bearing on the cover member 30-side with respect to the worm 26, and the cover member 30. In addition, the second oil seal 32 is provided between the bearing 34, which is a bearing on the drive motor 19-side with respect to the worm 26, and the drive motor 19 (the coupling). Thereby, a space, in which the worm 26 and the bearings 33 and 34 are accommodated, in the accommodation hole 25 for a worm shaft is separated from a space outside the first oil seal 31 and the second oil seal 32, and therefore, both sides in the longitudinal direction are closed. A space 27 closed in this way corresponds to the accommodation space of the present invention, and the worm 26 in a state of being accommodated in the accommodation space corresponds to the drive transmission member of the present invention.

Further, the rotary table device 1 includes a clamping device in the frame 2 for holding the main shaft 3 at an indexed angle position. Note that, in the present embodiment, as the clamping device, a so-called sleeve-type clamping device 38 configured to apply a clamping force to the main shaft 3 by a clamp sleeve 8 is adopted.

The clamping device 38 includes a clamp sleeve 8 and a fluid supply device (not shown). In addition, the clamp sleeve 8 has a cylindrical clamp portion 8a provided in a form of facing the outer peripheral surface of the main shaft 3 so as to apply a clamping force to the main shaft 3, and a flange portion 8b provided so as to attach the clamp sleeve 8 to the frame 2 and extending outward in a radial direction from the clamp portion 8a. In addition, the clamp portion 8a is formed with an annular groove 8c over an outer periphery thereof, and a portion of the clamp portion 8a corresponding to the groove 8c is a thin portion whose thickness is small.

Note that, in the accommodation hole 10 of the frame 2, an end portion on the upper surface 36-side in the vertical direction is a diameter-enlarged portion (second diameter-enlarged portion) 10c formed in such a shape that a diameter is enlarged. In other words, the upper surface 36 of the frame 2 is formed to have a portion (inner portion) 36a on an inner side located at a position (a position spaced from the table 4) lower than a portion (outer portion) 36b on an outer side that is an upper end of the frame 2, and a range of the inner portion 36a is the second diameter-enlarged portion 10c of the accommodation hole 10. Note that, a depth of the second diameter-enlarged portion 10c (a step between the outer portion 36b and the inner portion 36a of the upper surface 36 of the frame 2) is substantially the same as a thickness of the flange portion 8b of the clamp sleeve 8 in the axis line direction.

Further, the clamp sleeve 8 is attached to the frame 2 so as not to be relatively rotatable by a plurality of attaching bolts in a state where the clamp portion 8a is fitted in the gap between an inner peripheral surface of a portion other than the second diameter-enlarged portion 10c of the accommodation hole 10 and an outer peripheral surface of a portion of the main shaft 3 facing the inner peripheral surface and the flange portion 8b is in contact with the inner portion 36a, Thereby, the clamp sleeve 8 is in a state where the inner peripheral surface of the clamp portion 8a faces the outer peripheral surface of the main shaft 3 with a slight gap. Note that, the clamp sleeve 8 is in a state where each of portions on both sides of the groove 8c of the outer peripheral surface of the clamp portion 8a in the vertical direction is in close contact with the inner peripheral surface of the accommodation hole 10 via an O-ring. An annular space surrounded by the groove 8c of the clamp portion 8a and the inner peripheral surface of the accommodation hole 10 serves as a pressure chamber to which a working fluid from the fluid supply device is supplied.

In addition, an outer diameter of the flange portion 8b of the clamp sleeve 8 is smaller than an outer diameter of the inner portion 36a of the upper surface 36 of the frame 2 (an inner diameter of the second diameter-enlarged portion 10c of the accommodation hole 10). Therefore, in the state where the clamp sleeve 8 is attached to the frame 2 as described above, an annular groove 17b whose position in a radial direction of the main shaft 3 is defined by the flange portion 8b and the frame 2 (a portion of the outer portion 36b of the upper surface 36) is formed on an outer side of the flange portion 8b.

Further, the rotary table device 1 has a bearing (second bearing) 9 that is different from the first bearing 15 described above and is provided so as to directly support the table 4 with respect to the frame 2. More specifically, in the present embodiment, as the second bearing 9, a thrust cylindrical roller bearing is adopted. The second bearing 9 is interposed between the table 4 and the frame 2 in a form of being accommodated in the annular groove 17b on the frame 2-side and supporting the lower surface 37 of the table 4.

Note that, in the rotary table device 1 of the present embodiment, the table 4 has an annular groove 4d at a position, which faces the inner portion 36a of the upper surface 36 of the frame 2, on the lower surface thereof. Therefore, in the rotary table device 1, an interval between the upper surface 36 (inner surface 36a) of the frame 2 and the lower surface 37 (bottom surface 37a of the groove 4d) of the table 4 at the position of the groove 17b on the frame 2-side in the radial direction of the main shaft 3 is larger than the step between the outer portion 36b and the inner portion 36a of the upper surface 36 of the frame 2. In addition, the second bearing 9 is provided at that position in the form as described above.

Further, there is a slight gap between the lower surface 37 of the table 4 supported by the second bearing 9 and the outer portion 36b of the upper surface 36 of the frame 2. Therefore, a seal member is provided in the gap. Specifically, an O-ring 11 is interposed in the gap, and a dust seal 12 is interposed outside the O-ring. Thereby, the gap is in a state of being partitioned by the O-ring 11 and the dust seal 12. As a result, the space 17 formed between the lower surface 37 of the table 4 (bottom surface 37a of the groove 4d) and the upper surface 36 (inner portion 36a) of the frame 2 on a more inner side than the gap is in a state of being closed on an outer side thereof.

In the rotary table device 1 described above, in the present invention, the frame 2 is provided with a communication passage 28 configured so that the space 17 and the accommodation space 27 communicate with each other. In addition, the present embodiment is an example where the two communication passages 28 are provided. The rotary table device 1 of the present embodiment is described in detail, as follows.

In the rotary table device 1, the frame 2 is provided with a through-hole 20 configured so that the space 17 and the accommodation space 27 communicate with each other. Note that, the through-hole 20 is opened to the accommodation space 27 at a position near a shaft center of the worm shaft 6 in the radial direction, when seen in the axis line direction of the worm shaft 6 accommodated in the accommodation space 27. In addition, the through-hole 20 is formed to extend in parallel to the axis line direction (vertical direction) of the main shaft 3 from the position where it is opened to the accommodation space 27. Further, on the space 17-side, the through-hole 20 is opened at a position on a more inner side than the second bearing 9 (groove 17b) at the inner portion 36a of the upper surface 36 of the frame 2.

Further, as for the through-holes 20, in the present embodiment, two through-holes 20 and 20 are formed, as described above, and the two through-holes 20 and 20 are provided at an interval in the longitudinal direction of the accommodation space 27. More specifically, one of the two through-holes 20 and 20 is opened (communicates) to the accommodation space 27 defined by the first oil seal 31 and the second oil seal 32 as described above, on a side closer to the first oil seal 31 than a center in the longitudinal direction. That is, one through-hole 20 is opened to the accommodation space 27 at a position closer to one end portion (first oil seal 31) of the accommodation space 27 than the center. Similarly, the other through-hole 20 is opened to the accommodation space 27 on a side closer to the second oil seal 32 than the center in the longitudinal direction, i.e., at a position closer to the other end portion (second oil seal 32) of the accommodation space 27 than the center.

Note that, as described above, in the rotary table device 1, the flange portion Sb of the clamp sleeve 8 is attached in contact with the upper surface 36 (inner portion 36a) of the frame 2 on a more inner side than the groove 17b of the space 17. That is, the flange portion 8b of the clamp sleeve 8 exists in a form of closing the inner portion 36a of the upper surface 36 of the frame 2. Therefore, the flange portion Sb is also formed with a through-hole 21 penetrating the flange portion 8b in a thickness direction at a position communicating with each through-hole 20. Thereby, the rotary table device 1 is in a state where the space 17 and the accommodation space 27 are caused to communicate with each other by the two communication passages 28 and 28 each consisting of the through-hole 20 and the through-hole 21 corresponding to the through-hole 20.

Further, in the rotary table device 1 of the present embodiment, the main shaft 3 is provided with an air communication passage 22 configured so that the space 17 and the first diameter-enlarged portion 10b of the accommodation hole 10 communicate with each other. Note that, in the present embodiment, as described above, since the clamp portion 8a of the clamp sleeve 8 is provided between the main shaft 3 and the frame 2 (inner peripheral surface of the accommodation hole 10), and therefore, the gap therebetween is closed, the air communication passage 22 is a passage provided to allow an air inside the space 17 to which lubricating oil is supplied to escape to an outside of the space 17, as will be described later.

More specifically, as for the air communication passage 22, an end portion on one end-side, which is the table 4-side in the axis line direction, of the main shaft is configured as a small-diameter portion 3f formed so that an outer diameter thereof is slightly smaller than a portion facing the thin portion of the clamp sleeve 8 (a portion where the groove 8c of the clamp portion 8a is formed). Thereby, on one end-side of the main shaft 3, there is a slight gap between the small-diameter portion 3f and the clamp portion 8a of the clamp sleeve 8. In addition, the main shaft 3 is formed with a through-hole 22a penetrating in the radial direction of the main shaft 3 in a form of being opened to an outer peripheral surface of the small-diameter portion 3f and the through-hole 3d. Further, the main shaft 3 is formed with a communication hole 22b formed to communicate with the through-hole 22a and penetrating in the axis line direction of the main shaft 3 so as to be opened to an end surface on the other end-side of the main shaft 3.

Note that, the worm wheel 5 is attached to the end portion on the other end-side of the main shaft 3, as described above, and the worm wheel 5 is formed with a through-hole 5a penetrating in the axis line direction of the main shaft 3 at a position of a center thereof. An inner diameter of the through-hole 5a is larger than the inner diameter of the through-hole 3d of the main shaft 3. In addition, a position where the communication hole 22b is opened to the end surface on the other end-side of the main shaft 3 is a position on a more inner side than the inner peripheral surface of the through-hole 5a of the worm wheel 5. Thereby, the space 17 is in a state of communicating with the first diameter-enlarged portion 10b of the accommodation hole 10 by the air communication passage 22 consisting of the through-hole 22a and the communication hole 22b. Such eight air communication passages 22 are provided at intervals around the axis line of the main shaft 3.

In the rotary table device 1 described above, lubricating oil for lubricating the worm mechanism 7 is stored at least in the space in the diameter-enlarged portion 10b and the accommodation space 27 in the frame. In addition, in the accommodation space 27, the worm 6 whose tooth surfaces of the continuous teeth form a spiral groove shape is rotationally driven by the drive motor 19, so that a flow of the lubricating oil corresponding to the rotation direction is generated. Note that, both end portions of the accommodation space 27 are closed by the first oil seal 31 and the second oil seal 32. Therefore, with the occurrence of such a flow of the lubricating oil, the lubricating oil is in a state of staying on an end portion-side of the accommodation space 27, which is a downstream side of the flow. As the rotational drive of the worm 6 is continued, a range in which the lubricating oil stays in the accommodation space 27 gradually increases from the end portion-side.

In addition, the rotary table device 1 is configured to have the communication passage 28 consisting of the through-hole 20 of the frame 2 and the through-hole 21 of the clamp sleeve 8 corresponding to the through-hole 20 as described above, so as to cause the space 17 and the accommodation space 27 to communicate with each other. Thereby, when the range in which the lubricating oil stays in the accommodation space 27 reaches the position of the communication passage 28 (through-hole 20), the lubricating oil affected by a pressure resulting from the flow flows into the through-hole 20-side, and the lubricating oil is supplied to the space 17 through the communication passage 28. As a result, the second hearing 9 provided in the space 17 is lubricated by the lubricating oil. That is, the second bearing 9 is lubricated by the lubricating oil that lubricates the worm mechanism 7. Therefore, according to the rotary table device 1, it is not necessary to adopt grease lubrication so as to lubricate the second hearing 9, so that maintenance for grease lubrication becomes unnecessary.

In addition, in the present embodiment, the two communication passages 28 and 28 are provided to communicate with the accommodation space 27 at an interval in the longitudinal direction of the accommodation space 27, and one communication passage 28 is configured to communicate with the accommodation space 27 at a position close to the oil seal 31 and the other communication passage 28 is configured to communicate with the accommodation space 27 at a position close to the oil seal 32. That is, the position where each communication passage 28 communicates with the accommodation space 27 is a further downstream position on the end portion-side where the lubricating oil stays. Thereby, as compared to a configuration where only one communication passage communicates with the accommodation space 27, a time for which the range in which the lubricating oil stays increases from the end portion on the downstream side and reaches the position of the communication passage 28 is shortened, regardless of the rotation direction of the worm 26 that is rotationally driven. Therefore, according to the rotary table device 1, the lubrication of the second bearing 9 by the lubricating oil is performed more efficiently.

Note that, the rotary table device 1 of the present embodiment employs the sleeve-type clamping device 38 as a clamping device, and is configured so that the gap between the main shaft 3 and the accommodation hole 10 of the frame 2 is closed by the clamp portion 8a of the clamp sleeve 8. For this reason, the portion of the accommodation hole 10 closer to the diameter-enlarged portion 10b-side than the space 17 is closed by the clamp sleeve 8. Therefore, in the rotary table device 1, the main shaft 3 is formed with the air communication passage 22 configured so that the space 17 and the first diameter-enlarged portion 10b of the accommodation hole 10 communicate with each other. In addition, the plurality of (eight) air communication passages 22 is provided at intervals around the axis line of the main shaft 3.

According to the configuration, in the rotary table device 1, the air inside the space 17 to which the lubricating oil is supplied can be escaped from the air communication passages 22 toward the diameter-enlarged portion 10b-side. Thereby, the air existing in the space 17 that is about to be pushed as the lubricating oil is supplied to the space 17 escapes to the air communication passages 22, so that the lubricating oil is supplied into the space 17 without receiving a resistance of the air in the space 17 as much as possible.

In the above, one embodiment of the rotary table device of the present invention has been described. However, the rotary table device of the present invention is not limited to the above embodiment, and can also be implemented in following modified forms.

(1) As for the drive transmission mechanism, in the above embodiment, the worm mechanism 7 including the worm wheel 5 and the worm 26 is adopted as the drive transmission mechanism for transmitting the rotation of the drive motor 19 to the main shaft 3. However, the drive transmission mechanism of the present invention is not limited to the worm mechanism, and may also be another type of a drive transmission mechanism including a drive transmission member having a spiral groove on an outer periphery.

Specifically, the drive transmission mechanism may also be a so-called ball drive mechanism where a worm wheel and a worm are connected via a steel ball. In addition, the drive transmission mechanism may also be a so-called roller gear cam mechanism where a turret wheel having a plurality of roller followers attached to an outer periphery at intervals and a roller gear cam having a spiral cam groove corresponding to rollers of the roller followers and provided on an outer periphery are connected, in the former case, the worm having a spiral groove, in which a ball fits, formed on an outer peripheral surface corresponds to the drive transmission member. In addition, in the latter case, the roller gear cam having a spiral groove, with which the roller engages, formed on an outer peripheral surface corresponds to the drive transmission member.

(2) As for the communication passage, in the rotary table device 1 of the above embodiment, the two communication passages 28 are provided. The two communication passages 28 and 28 are each provided on both sides of the center of the accommodation space in the longitudinal direction. However, in the rotary table device of the present invention, the number of the provided communication passages is not limited to two as in the above embodiment, and the positions thereof are also not limited to both sides of the center.

Specifically, the rotary table device may be used in such an aspect that the drive transmission member is rotationally driven highly frequently in one direction (for example, forward rotation direction) with respect to the rotation direction thereof (forward rotation or reverse rotation), depending on a use form such as a kind of processing for which the rotary table device is used, in such a case, a frequency that the lubricating oil stays on a side of one end portion of both end portions of the accommodation space increases. Therefore, in the rotary table device of such a use form, one communication passage may be provided only on the side of the one end portion.

Further, when the drive transmission member is rotationally driven highly frequently in one (or the other) direction, particularly when a time for which the drive transmission member is rotationally driven continuously in one (the other) direction is long, or the like, two (or three or more) communication passages may be provided on the side of the one end portion (or the other end portion of both end portions of the accommodation space). Note that, even when the drive transmission member is rotationally driven highly frequently in one (the other) direction, one or more communication passages may also be provided on a side of the other (the one direction) end portion.

Further, the position where the communication passage is provided is not limited to the side of the one end and/or the other end portion of the accommodation space as described above, and for example, when a dimension of the accommodation space in the longitudinal direction is small, the position may also be a center (or near the center) in the longitudinal direction.

Further, in the above embodiment, the communication passage 28 is formed to be parallel to the axis line direction of the main shaft 3 in the rotary table device 1, i.e., to be parallel to the vertical direction in the horizontal rotary table device 1. However, in the present invention, the communication passage is not limited to being formed to be parallel to the vertical direction, and may be formed in any shape such as forming an angle with the vertical direction when seen in a horizontal direction orthogonal to the longitudinal direction of the accommodation space, for example, as long as the communication passage is configured so that the accommodation space communicate with the space in which the bearing is arranged between the lower surface of the table and the upper surface of the frame, Further, in the above embodiment, the communication passage 28 is formed to communicate with the space 17 in a form of being opened to the portion, which faces the lower surface of the table 4, of the upper surface of the frame 2. However, the communication passage of the present invention is not limited to being formed to be opened to the portion, which faces the lower surface of the table, of the upper surface of the frame, and for example, may be formed to be opened to a surface facing the bearing when the upper surface of the frame is formed to have the surface facing the bearing (the above embodiment: the second bearing 9) provided between the lower surface of the table and the upper surface of the frame.

Further, in the above embodiment, the communication passage 28 is formed to communicate with the accommodation space 27 at the position near the shaft center of the worm 26 with respect to the radial direction of the main shaft 3, when seen in the axis line direction of the worm 26. That is, the communication position of the communication passage is a substantially central position of the accommodation space in the radial direction, when seen in the axis line direction of the drive transmission member. However, the communication position with respect to the accommodation space is not limited to such a position, and may also be a position (for example, an inner position) deviating radially from the substantially central position, when seen in the axis line direction.

(3) As for the rotary table device, in the above embodiment, the outer diameter of the second bearing 9 and the inner diameter of the space 17 in which the second bearing 9 is arranged have substantially the same size, and in the space 17, the upper surface of the frame 2 faces the lower surface of the table 4 on a more inner side than the second bearing 9 in the radial direction of the main shaft 3. In addition, the communication passage 28 is formed to be opened to the upper surface of the frame 2 on a more inner side than the second bearing 9 in the radial direction. However, the rotary table device to which the present invention is applied is not limited to being configured as described above, and for example, may be configured so that, in the space, the upper surface of the frame faces the lower surface of the table on a more outer side in the radial direction than the bearing by a relationship between a size of a space between the lower surface of the table and the upper surface of the frame and a diameter of the bearing provided in the space, an attaching method of the bearing, and the like. In this case, the communication passage may be formed to be opened to the upper surface of the frame on a more outer side than the bearing in the radial direction.

(4) As for the rotary table device that is the preamble, in the above embodiment, the sleeve-type clamping device is adopted, and the air communication passage 22 is formed as the gap between the main shaft 3 and the frame 2 (accommodation hole 10) is configured to be closed by the clamp sleeve 8. The air communication passage 22 is formed in the main shaft 3. However, even when the sleeve-type clamping device is adopted as described above and the air communication passage is formed, the air communication passage may also be formed in the frame, not the main shaft.

In addition, the rotary table device that is the preamble of the present invention is not limited to that where the sleeve-type clamping device as described above is adopted, and may also be one where a so-called disk-type clamping device configured to urge a piston to a clamp disk fixed to the main shaft to thereby apply a clamping force to the main shaft is adopted, in this case, the air communication passage as described above can be omitted because the gap between the main shaft and the frame is configured not to be closed.

The present invention is not limited to the above embodiment, and can be appropriately changed without departing from the gist of the present invention.

The invention claimed is:

1. A rotary table device comprising a table provided on one end-side of a main shaft rotatably supported in a frame; and a drive transmission mechanism configured to transmit rotation of an output shaft of a drive motor to the main shaft and including a drive transmission member having a spiral groove on an outer periphery and accommodated in an accommodation space formed in the frame, wherein the rotary table device is installed with an axis line of the main shaft being directed in a vertical direction, the table is supported with respect to the frame by a bearing provided between a lower surface of the table and an upper surface of the frame, and a space is provided between the lower surface of the table and the upper surface of the frame, wherein the frame is provided with a communication passage that is a through-hole opening to the accommodation space and configured so that the space and the accommodation space communicate with each other, the communication passage penetrating the frame.

2. The rotary table device according to claim 1, wherein the communication passage is configured so that at least two communication passages communicate with the accommodation space at an interval in a longitudinal direction of the accommodation space.

* * * * *